United States Patent
Hanlon et al.

(10) Patent No.: US 11,585,465 B2
(45) Date of Patent: Feb. 21, 2023

(54) MODULAR CONDUIT SYSTEMS WITH ALIGNMENT MEMBERS

(71) Applicant: Evergreen Innovation Group, LLC, Sacramento, CA (US)

(72) Inventors: Brandon David Hanlon, Los Gatos, CA (US); Mark Joseph Thompson, Belmont, CA (US)

(73) Assignee: Evergreen Innovation Group, LLC, Sacramento, CA (US)

( * ) Notice: Subject to any disclaimer, the term of this patent is extended or adjusted under 35 U.S.C. 154(b) by 205 days.

(21) Appl. No.: 17/011,832

(22) Filed: Sep. 3, 2020

(65) Prior Publication Data
US 2022/0065367 A1   Mar. 3, 2022

(51) Int. Cl.
| F16L 3/00 | (2006.01) |
| F16L 3/22 | (2006.01) |
| F16L 3/23 | (2006.01) |

(52) U.S. Cl.
CPC ................. *F16L 3/222* (2013.01); *F16L 3/23* (2013.01)

(58) Field of Classification Search
None
See application file for complete search history.

(56) References Cited

U.S. PATENT DOCUMENTS

| 1,851,940 A | 3/1932 | Williams |
| 4,007,951 A | 2/1977 | Legris |
| 5,453,931 A | 9/1995 | Watts, Jr. |
| 5,738,147 A | 4/1998 | Mestres |
| 5,971,329 A | 10/1999 | Hickey |
| 6,064,940 A | 5/2000 | Rodgers et al. |
| 6,330,503 B1 | 12/2001 | Sharp et al. |
| 6,588,868 B1 | 7/2003 | Skultety-Betz |
| 7,156,423 B2 | 1/2007 | Marks |
| 7,372,247 B1 | 5/2008 | Giusti et al. |
| 7,793,988 B1 | 9/2010 | Shemtov |
| 7,922,012 B2 | 4/2011 | Sisley |
| 7,926,766 B2 | 4/2011 | Tjerrild |
| 8,555,461 B2 | 10/2013 | Hachtmann |
| 9,043,028 B2 | 5/2015 | Miller |
| 9,106,068 B2 | 8/2015 | Barna |
| 9,145,985 B2 | 9/2015 | Vrame et al. |
| 9,909,692 B2 | 3/2018 | Dean et al. |
| 10,240,896 B2 | 3/2019 | Mijares |
| 10,268,202 B1 | 4/2019 | Casale et al. |
| 10,644,486 B2 | 5/2020 | Gintz |
| 2007/0059098 A1 | 3/2007 | Mayfield et al. |
| 2008/0046221 A1 | 2/2008 | Stathis |
| 2009/0231582 A1 | 9/2009 | Aebischer et al. |

(Continued)

*Primary Examiner* — Steven M Marsh
(74) *Attorney, Agent, or Firm* — Carr & Ferrell LLP (57) ABSTRACT

Modular conduit alignment and resultant conduit systems are disclosed herein. An example system includes a plurality of modular sections, one of which connects to an terminal enclosure, each of the plurality of conduit assemblies having at least one coupler assembly having a first plurality of conduit interfaces extending from a first side of the at least one coupler assembly and a second plurality of conduit interfaces a second side of the at least one coupler assembly. The first plurality of conduit interfaces and the second plurality of conduit interfaces are aligned and form pathways that allow wiring to extend through the plurality of modular sections when the plurality of modular sections are arranged in series.

20 Claims, 7 Drawing Sheets

(56) References Cited

U.S. PATENT DOCUMENTS

| | | | |
|---|---|---|---|
| 2011/0043515 A1 | 2/2011 | Stathis | |
| 2011/0172870 A1 | 7/2011 | Fudala | |
| 2014/0277728 A1 | 9/2014 | Miller | |
| 2015/0285644 A1 | 10/2015 | Pfaff et al. | |
| 2017/0122463 A1 | 5/2017 | Vaccaro | |
| 2017/0184223 A1* | 6/2017 | Dean | F16L 3/1211 |
| 2019/0145551 A1* | 5/2019 | Schwalbe | F16L 3/1091 |
| | | | 248/67.5 |
| 2019/0196492 A1 | 6/2019 | Casale et al. | |
| 2020/0096135 A1 | 3/2020 | Witherbee | |
| 2020/0287369 A1* | 9/2020 | Kaun | H02G 3/0456 |
| 2020/0403390 A1* | 12/2020 | Jette | H02S 40/30 |

* cited by examiner

MODULAR CONDUIT SYSTEMS WITH ALIGNMENT MEMBERS

CROSS REFERENCE TO RELATED APPLICATIONS

N/A

FIELD OF THE INVENTION

The present disclosure is directed generally to modular conduit alignment systems for quickly and efficiently installing conduits in a structure. The systems can be assembled in a modularized manner. Some embodiments include alignment members (e.g., coupler assemblies) that are configured to align adjacent sets of conduits. A plurality of conduit assemblies can be connected together between a terminal enclosure and various terminal points in the structure.

SUMMARY

Some embodiments of the present disclosure can be directed to a coupler assembly comprising a first conduit interface comprising: a first conduit body; a first plurality of conduit interfaces extending normally from the first conduit body, the first plurality of conduit interfaces being aligned with a first set of conduits; and a plurality of alignment protrusions; and a second conduit interface comprising: a second conduit body; a second plurality of conduit interfaces extending normally from the second conduit body, the second plurality of conduit interfaces being aligned with a second set of conduits; and a plurality of alignment receivers configured to mate with the plurality of alignment protrusions of the first conduit interface.

Some embodiments of the present disclosure can be directed to a plurality of conduit assemblies, each of the conduit assemblies comprising a coupler assembly and a plurality of conduits; and the coupler assembly comprising: a first conduit interface comprising: a first conduit body; a first plurality of conduit interfaces extending normally from the first conduit body, the plurality of conduit interfaces mating with the plurality of conduits; and a plurality of alignment protrusions; and a second conduit interface comprising: a second conduit body; a second plurality of conduit interfaces extending normally from the second conduit body; and a plurality of alignment receivers configured to mate with the plurality of alignment protrusions of the first conduit interface, wherein the plurality of conduits mate with another coupler assembly of an adjacent one of the plurality of conduit assemblies.

Some embodiments of the present disclosure can be directed to a system having plurality of conduit assemblies, one of which connects to a terminal enclosure, each of the plurality of conduit assemblies comprising at least one coupler assembly having a first plurality of conduit interfaces extending from a first side of the at least one coupler assembly and a second plurality of conduit interfaces a second side of the at least one coupler assembly, wherein the first plurality of conduit interfaces and the second plurality of conduit interfaces are aligned and form pathways that allow wiring to extend through the plurality of conduit assemblies when the plurality of conduit assemblies are arranged in series.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Overview

The present disclosure generally pertains to conduit systems and the installation and construction of the same in a structure. These conduit systems include modular sections that can be interconnected to extend between a terminal enclosure and one or more terminal areas of a structure. The modularization of the sections allows for quick and error-free installation of conduits in a structure. The terminal enclosure could include any of an alarm box, a telecommunications box, an electrical box, or the like—just to name a few. The enclosure can be complete or open in some embodiments. In one or more embodiments, the conduits can terminate in other locations or end points. For example, conduits can extend from one system or device directly to another system or device, where the systems or devices may or may not have an enclosure. Thus, the modular conduit assemblies herein can be utilized in conjunction with systems or structures that use terminal enclosures, and those that do not.

A modular section can include a set of conduits that are joined to at least one coupler assembly. A set of conduits can include one or more conduits. Another set of conduits of an adjacent modular section can be joined to an opposing side of the coupler assembly.

The coupler assembly includes two parts that each has conduit interfaces for receiving the ends of a set of conduits. The two parts can be aligned and connected together using alignment protrusions and alignment receivers. When the two parts of the coupler assembly are joined together, pathways are created from one set of conduits to another set of conduits. Wiring can extend through the pathways. In some instances, the coupler assembly can include adjustable mounting members that connect to a surface, such as a ceiling of the structure. The adjustable mounting members allow for incremental adjustments in vertical position of the coupler assembly and leveling of the conduits.

EXAMPLE EMBODIMENTS

Figure 1:
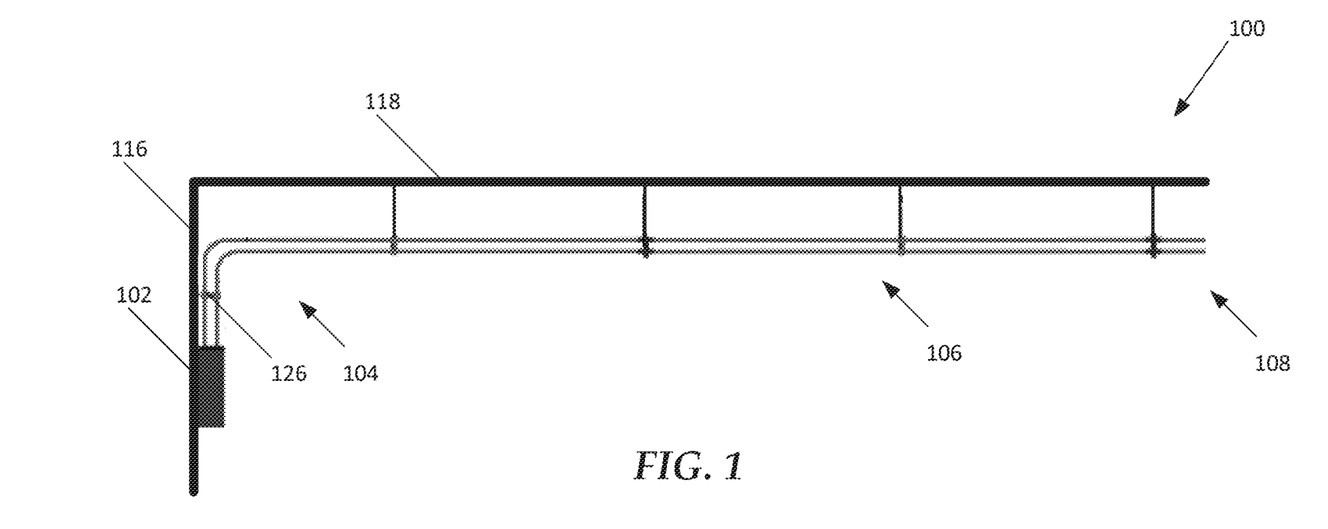
FIG. 1 is a side elevation view of an example system of the present disclosure, installed in an environment, such as a structure.
Figure 2:
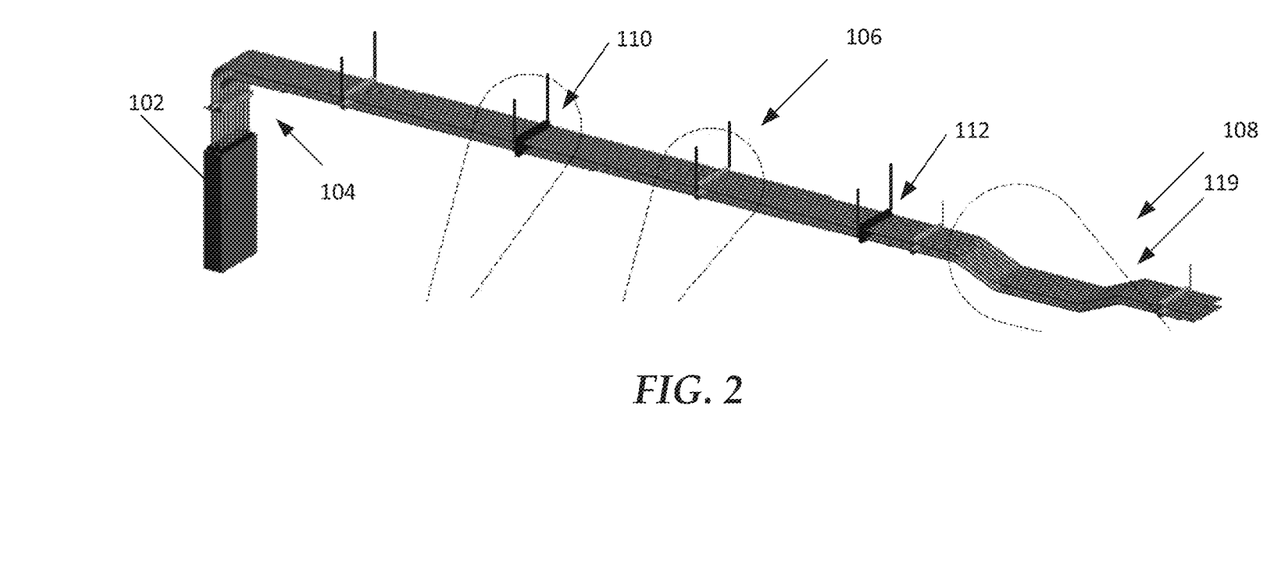
FIG. 2 is an isometric or perspective view of an example system of the present disclosure.

FIG. 1 depicts an illustrative architecture in which techniques and structures for providing the systems and methods disclosed herein may be implemented. FIG. 2 is an isometric view of FIG. 1. Both FIGS. 1 and 2 will be referenced collectively. An embodiment of a system 100 includes a terminal enclosure 102 (e.g., electrical box or panel), a plurality of modular sections that comprise sets of conduits joined together with coupler assemblies. For example, the system 100 includes a first set of conduits 104, a second set of conduits 106, and a third set of conduits 108. Fewer or more sets of conduits can be included based on the desired size of the system 100. Generally, the sets of conduits are arranged in series, with each set of conduits being coupled to another, adjacent set of conduits by a coupler assembly. In general, a modular section includes at least one coupler assembly having at least one set of conduits joined to the coupler assembly. In some instances, the at least one coupler assembly is coupled to another, adjacent set of conduits.

In general, the components described herein can be manufactured from any desired materials. For example, a coupler assembly could be manufactured from a metal, a composite, a plastic/polymer, or other material or combinations of materials. Conduits can also vary in their material composition.

In one embodiment, the system 100 includes two coupler assemblies. A first coupler assembly 110 couples the first set of conduits 104 with the second set of conduits 106. A second coupler assembly 112 couples the second set of conduits 106 with the third set of conduits 108. The coupler assemblies can be constructed identically to one another.

Figure 3:
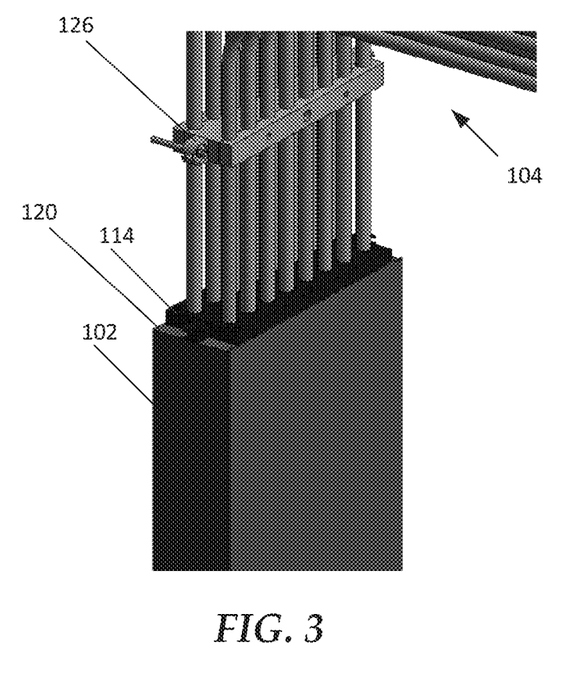
FIG. 3 is a perspective view of an example terminal enclosure in the form of an electrical junction box, an terminal enclosure interface, and a first set of conduits.

Referring to FIGS. 1-3 collectively, the first set of conduits 104 couples to the terminal enclosure 102 using a terminal enclosure interface 114. The terminal enclosure 102 can be mounted to a wall 116 of a structure. The first set of conduits 104 can each be curved, having radius that transitions the conduits from running parallel to the wall 116 to approximately normal so that the first set of conduits 104 extends parallel to a ceiling 118 of the structure. To be sure, a set of conduits can have any desired shape or pattern. A number of conduits in a set of conduits can vary as desired. Generally, the number of conduits in a set of conduits corresponds to a number of interfaces of the coupler assembly to which the set of conduits mates. In one embodiment, the conduits are arranged into an array with a top row and a bottom row.

Another example set of conduits 119 that have a unique shape is also illustrated. The set of conduits 119 has a concave shape allowing for the set of conduits to traverse or set below another object such as a duct or another set of conduits of another system.

In FIG. 3, the terminal enclosure interface 114 mounts directly to the top panel 120 of the terminal enclosure 102. The terminal enclosure interface 114 includes apertures 122 that align with holes 124 that are fabricated into a top panel 120 of the terminal enclosure 102. Ends of the first set of conduits 104 terminate within or couple with the terminal enclosure interface 114. The alignment of the apertures 122 and the holes 124 allows for wires that terminate within the terminal enclosure 102 to extend into the first set of conduits 104. The first set of conduits 104 is secured to the wall 116 using a support assembly 126. An example support assembly is illustrated and described in greater detail with respect to FIGS. 9-10. The terminal enclosure interface 114 can comprise either a portion of a coupler assembly (see FIGS. 4-8) or a support assembly (see FIGS. 9-10). In some embodiments, a modified version of the terminal enclosure interface 114 can be used as a template for fabricating apertures into the terminal enclosure 102. The template can be affixed to a desired surface of the terminal enclosure 102 and then removed after the apertures are fabricated.

As noted above, the first set of conduits 104 couples with the first coupler assembly 110. FIGS. 4-8 collectively illustrate the first coupler assembly 110. Generally, the first coupler assembly 110 comprises a first conduit interface 128 and a second conduit interface 130. The first conduit interface 128 mates with the first set of conduits 104 and the second conduit interface 130 mates with the second set of conduits 106, or vice-versa.

The first conduit interface 128 comprises a first conduit body 132. In some embodiments, the first conduit body 132 is a plate. The first conduit body 132 has a first plurality of conduit interfaces 134 (a single conduit interface is pointed to in FIGS. 7 and 8 by example) extending normally from the first conduit body 132. Generally, a number of the first plurality of conduit interfaces 134 corresponds to the number of the first set of conduits 104. To be sure, the first plurality of conduit interfaces 134 are aligned with and mate with the first set of conduits 104. In some embodiments, the first set of conduits 104 are coupled to the first plurality of conduit interfaces 134. In other embodiments, the first set of conduits 104 can be inserted on and overlap the first plurality of conduit interfaces 134 when mated. The first conduit interface 128 further comprises a plurality of alignment protrusions 136 (a single alignment protrusion is pointed to in FIGS. 7 and 8 by example) that align with and mate with elements (e.g., receivers) of the second conduit interface 130, as discussed below. In some embodiments, the connections between the conduit interfaces and the terminal ends of the conduits can be brazed, welded, or soldered together to form a permanent connection. Further, it will be understood that in some embodiments, a coupler assembly can include conduit interfaces of varying size. That is, a single coupler assembly could include conduit interfaces for multiple diameter or gauges of conduits.

Figure 7:
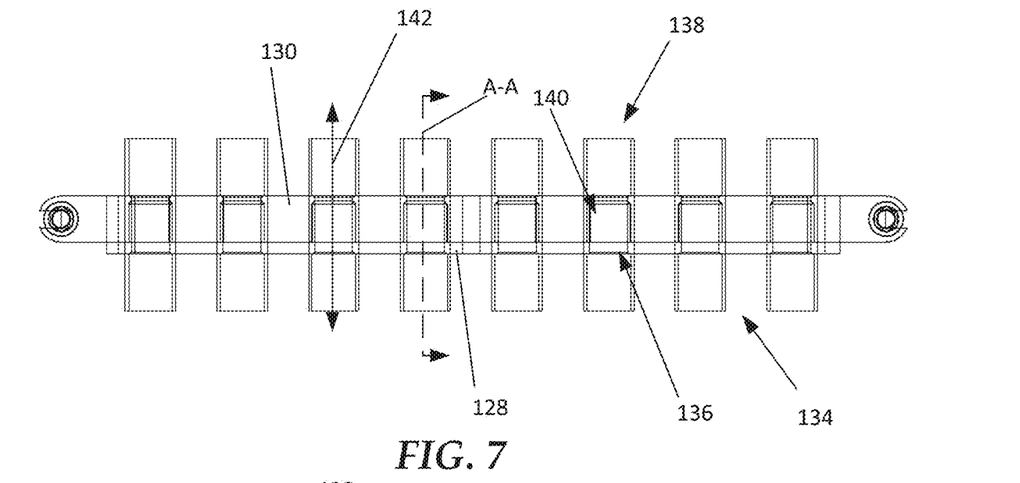
FIG. 7 is a cross-sectional view of an example conduit assembly.
Figure 8:
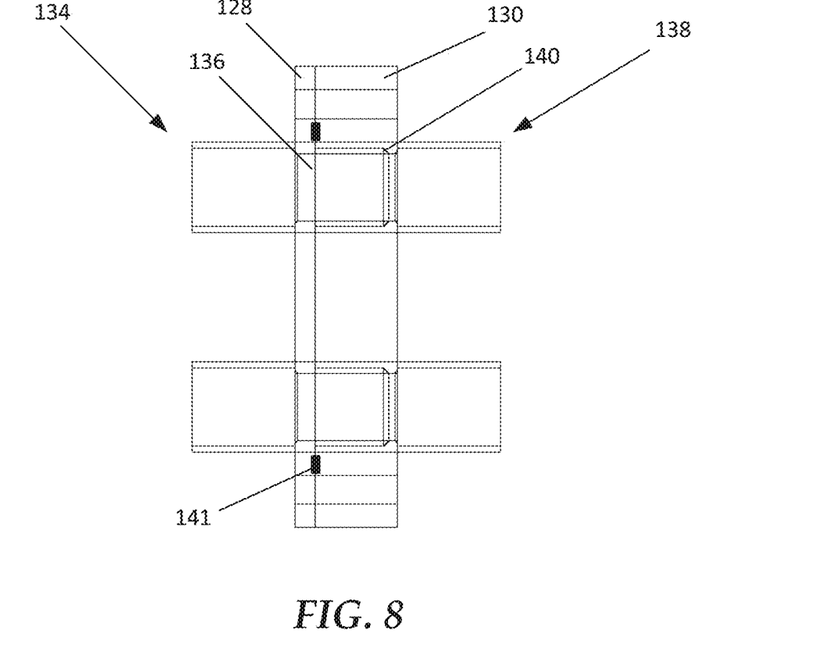
FIG. 8 is another cross-sectional view of an example conduit assembly.
Figure 9:
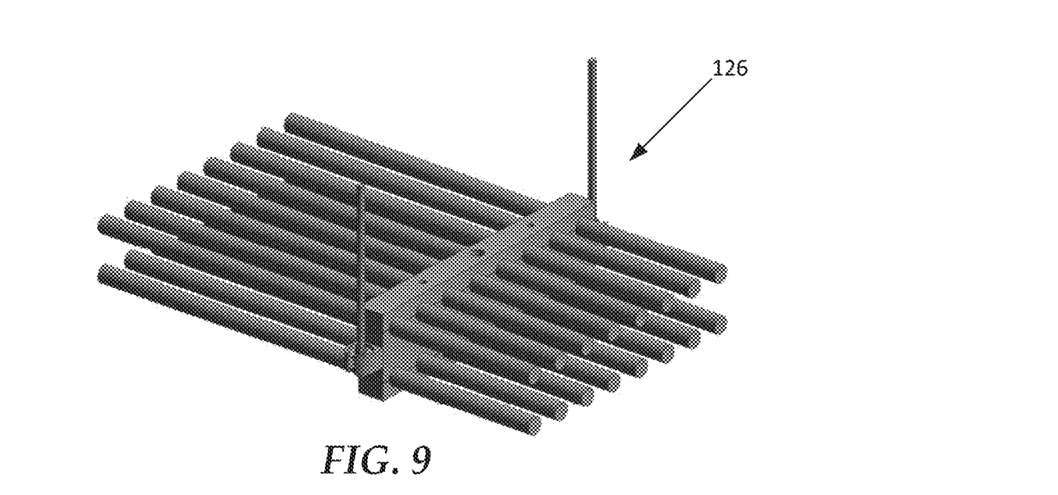
FIG. 9 is a perspective view of an example support assembly in combination with a set of conduits.

The second conduit interface 130 can comprise a second conduit body 137 having a second plurality of conduit interfaces 138 extending normally from the second conduit body 137. As noted above, the second plurality of conduit interfaces 138 align with and mate with the second set of conduits 106. The second conduit interface 130 can also comprise a plurality of alignment receivers 140 that are configured to receive the plurality of alignment protrusions 136 of the first conduit interface 128.

FIGS. 7 and 8 illustrate the alignment and mating of the plurality of alignment receivers 140 of the second conduit interface 130 with the plurality of alignment protrusions 136 of the first conduit interface 128. Generally, FIG. 8 is a cross-section of FIG. 7, taken through line A-A. When the plurality of alignment receivers 140 mates with the plurality of alignment protrusions 136, pathways, such as pathway 142 are created. Wires can extend through these pathways from one set of conduits coupled to the first conduit interface 128 to a second set of conduits coupled to the second conduit interface 130. As noted throughout, the plurality of alignment receivers 140 and the plurality of alignment protrusions 136 correspond in number to one another.

Figures 4, 5, 6:
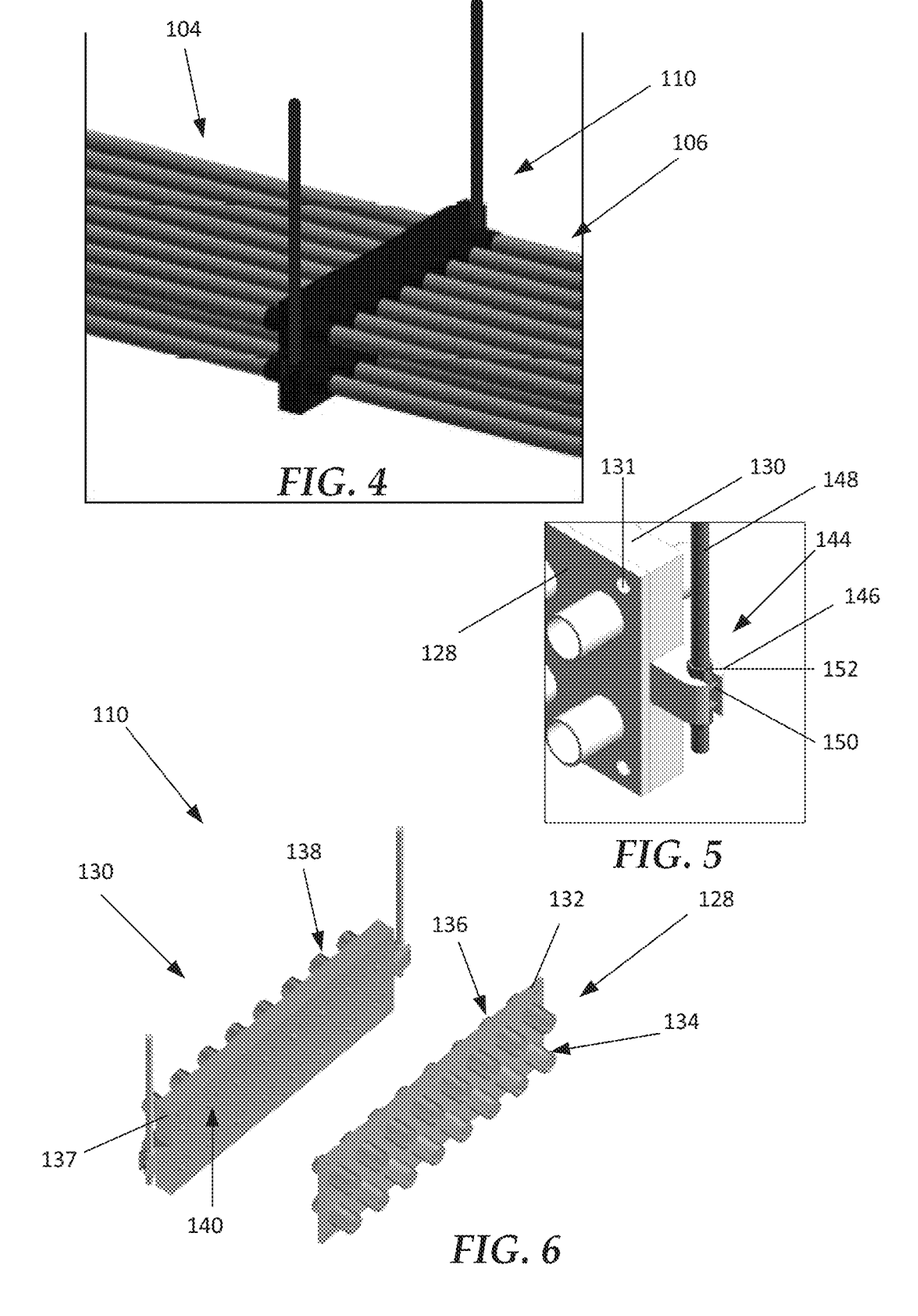
FIG. 4 is a perspective view of an example conduit assembly.
FIG. 5 is a perspective view of an example hangar assembly of a conduit assembly.
FIG. 6 is an exploded, perspective view of an example conduit assembly.

As best illustrated in FIGS. 5 and 8, the first conduit interface 128 can mate in face-to-face relationship with the second conduit interface 130, such that the plate of the first conduit interface 128 contacts an inner surface of the second conduit interface 130. A plurality of fasteners can be used to secure the first conduit interface 128 and the second conduit interface 130 through holes (such as hole 131) provided around a periphery of the first coupler assembly 110. That is, the first conduit interface 128 and the second conduit interface 130 have complementary holes that align when joined. Fasteners can be used to secure the first conduit interface 128 and the second conduit interface 130. A fastener can include a screw or threaded shaft member, a pin, a clip, rivet, an adhesive, or any other object that can be used to secure two separate items together. Also, in some embodiments, a gasket or seal 141 can be inserted between the interfacing surfaces of the first conduit body 132 and the second conduit body 137. When the first conduit interface 128 and the second conduit interface 130 are joined together, the gasket or seal 141 is compressed therebetween to create a watertight seal. Either or both of the faces of the first conduit body 132 and the second conduit body 137 could be fabricated with a groove or slot to receive the gasket or seal 141. Generally, the gasket or seal 141 encloses or encircles a perimeter around the plurality of alignment protrusions 136 and the plurality of alignment receivers 140 when they are joined together.

The first coupler assembly 110 can comprise a hangar assembly 144 having an armature 146 that cooperates with a suspension member 148 to allow the first coupler assembly 110 to attach to a mounting surface such as the ceiling. In more detail, the armature 146 comprises a substantially c-shaped bracket that receives at least one washer 150 and nut 152. The suspension member 148 can include a threaded rod that threads onto the washer 150 and nut 152. The washer 150 and nut 152 can be used to make fine-tuned adjustments in the vertical position of the first coupler assembly 110 relative to the ceiling. In some embodiments, more than one washer and nut can be placed into the armature 146. One set of washer and nut positioned below can be used to lock the position of the first coupler assembly 110 on the hangar assembly 144. The allowance for vertical adjustment can compensate for variations in ceiling height or other obstructions.

Figure 10:
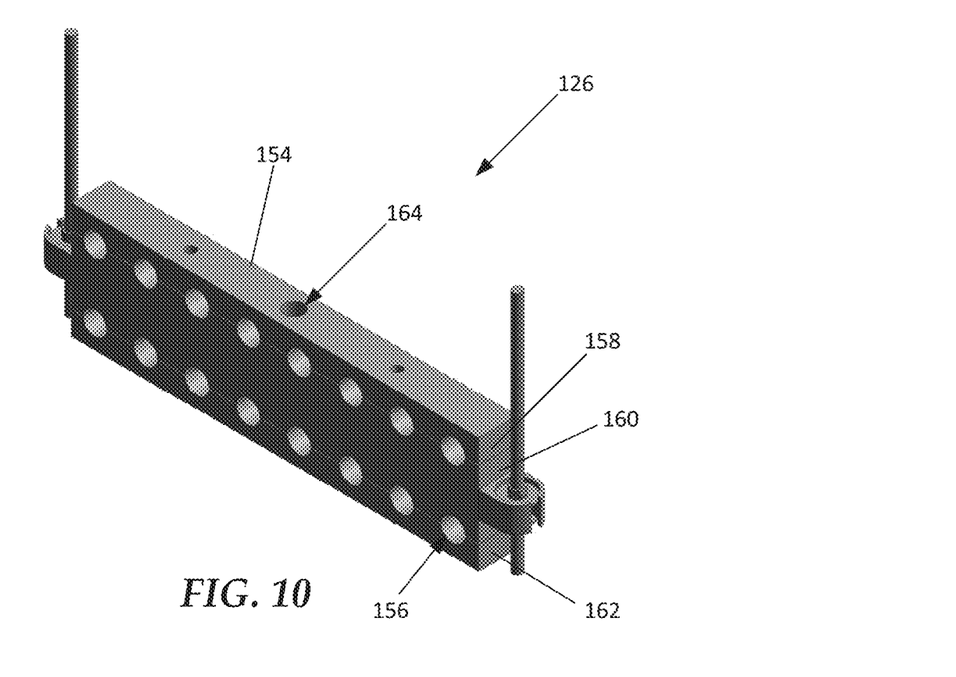
FIG. 10 is a perspective view of an example support assembly.
Figure 11:
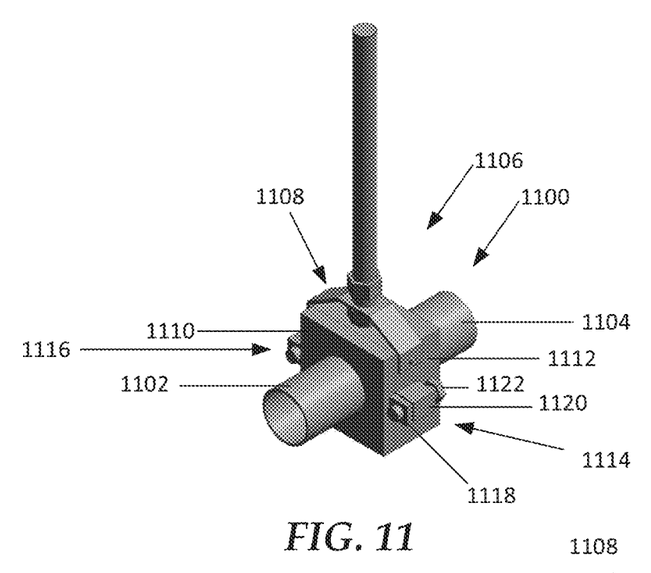
FIGS. 11-13 collectively illustrate another example conduit assembly of the present disclosure.

FIGS. 10 and 11 collectively illustrate an example support assembly that corresponds to the support assembly 126 of FIG. 1. The support assembly 126 can be used to support a set of conduits between two spaced-apart coupler assemblies. An example support assembly 126 can be positioned between the first coupler assembly 110 and the second coupler assembly 112. The support assembly 126 can also include a hangar assembly (see FIG. 5) for connecting the support assembly 126 to a surface, such as the ceiling or wall. The support assembly 126 bears at least a portion of the weight of a set of conduits that extend between two coupler assemblies to prevent the set of conduits from sagging.

The support assembly 126 comprises a support assembly body 154 having a plurality of pass through apertures 156. A set of conduits pass through the plurality of pass through apertures 156. In one example, a set of conduits has a first coupler assembly connected to one end of the set of conduits and a second coupler assembly connected to another end of the set of conduits, with the support assembly being positioned approximately midway between the first coupler assembly and the second coupler assembly. As noted above, in some instances, more than one support assembly can be used for a set of conduits (see the set of conduits 119 of FIG. 2 as an example).

In some embodiments, the support assembly 126 is a tripartite member having a first portion 158, a second portion 160, and a third portion 162. Each of the first portion 158, the second portion 160, and the third portion 162 include semicircular cutouts. The pass through apertures 156 are formed when the first portion 158, the second portion 160, and the third portion 162 are joined together. The semicircular cutouts of the first portion 158 mate with the semicircular cutouts on the upper portion of the second portion 160 to form an upper row of the pass through apertures 156. The semicircular cutouts of the third portion 162 mate with the semicircular cutouts on the lower portion of the second portion 160 to form a lower row of the pass through apertures 156. The portions of the support assembly 126 can be secured together using a fastener inserted through a port 164 fabricated through the support assembly 126. In some instances, a hangar assembly can be associated with the second portion 160 of the support assembly 126.

To be sure, support assemblies can be replaced with additional coupler assemblies. That is, where support assemblies are illustrated, these support assemblies can be replaced with coupler assemblies such that all sets of conduits are supported on both ends with coupler assemblies.

In operation, an electrical box interface can be installed on an terminal enclosure. A first set of conduits can be attached to the electrical box interface. If desired, a support assembly can be aligned onto the first set of conduits prior to coupling the first set of conduits to the terminal enclosure interface. This support assembly can secure the first set of conduits to a wall. Next, another support assembly is coupled with the first set of conduits. A first coupler assembly is connected to the terminal ends of the first set of conduits. The first coupler assembly can be pre-terminated with another set of conduits and a second coupler assembly, in some embodiments. This combination of a set of conduits and one or more coupler assemblies is referred to generally above as a modular assembly. Attachment of a modular assembly to an already-installed coupler assembly is easily accomplished due to the alignment of the set of conduits provided by their connection to a coupler assembly.

If desired, another support assembly can be installed between the first coupler assembly and the second coupler assembly. Additional modular assemblies can be connected to the second coupler assembly in a similar manner. If needed, uniquely shaped sets of conduits can be used as noted above, on an as-needed basis.

As noted above, hangar assemblies of the support assemblies and the coupler assemblies can be adjusted and secured to a ceiling of the structure to ensure that the sets of conduits are level and vertically aligned.

Figure 12:
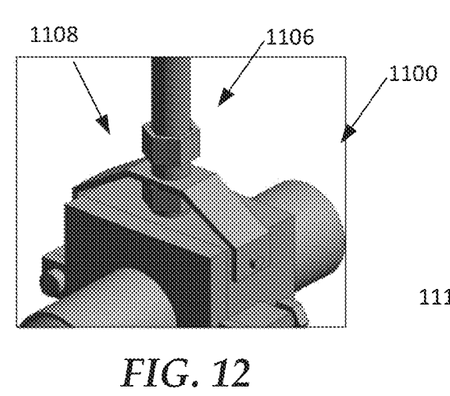
Figure 13:
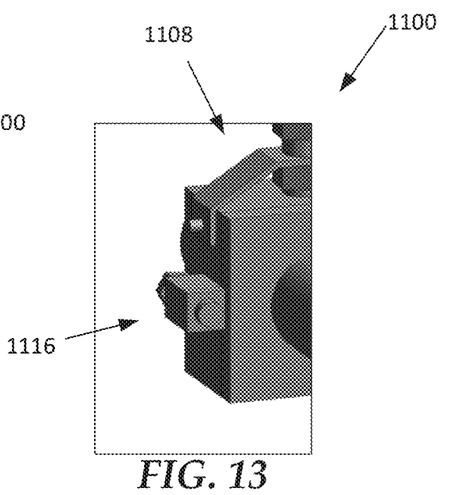

FIGS. 11-13 collectively illustrate an example conduit assembly 1100 that can interface with only one conduit 1102 on its first side and an opposing conduit 1104 on another side. The construction of the conduit assembly 1100 is identical to that of the first coupler assembly 110 described above. The conduit assembly 1100 can be suspended or connected to a surface using a hangar assembly 1106. The hangar assembly 1106 includes a winged hangar 1108 that attaches to opposing sides of the conduit assembly 1100. The hangar assembly 1106 can include a threaded height adjustment means as with the embodiments described above.

A first portion 1110 and a second portion 1112 of the conduit assembly 1100 can be connected together and secured using locking members 1114 and 1116. For example, the locking member 1114 comprises a plate 1118 associated with the first portion 1110, and a block 1120 associated with the second portion 1112. Each of these elements (plate and block) can be threaded to receive a fastener 1122, for example. Other methods for joining the plate and block together can likewise be used.

Figure 14:
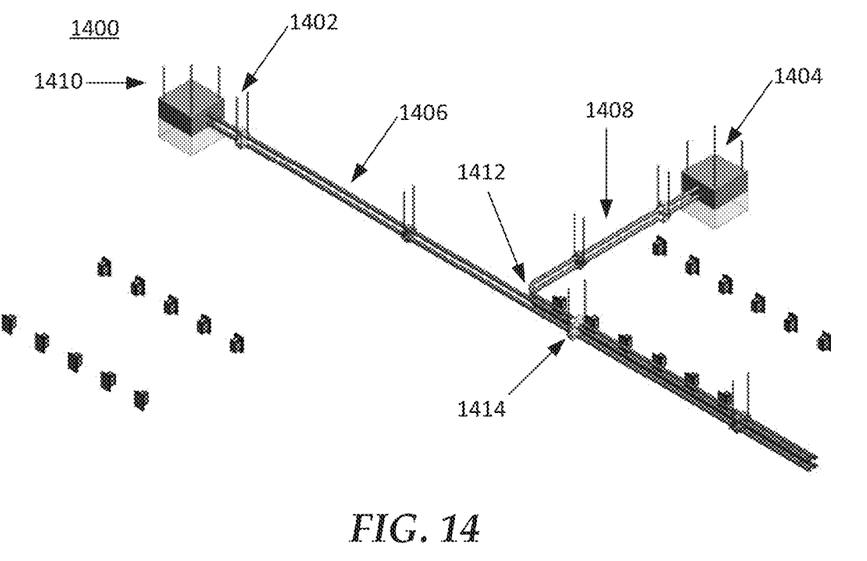
FIG. 14 is a perspective view of an example system that includes two example terminal enclosures and two distinct runs of conduits.

FIG. 14 illustrates a system 1400 where two terminal enclosures 1402 and 1404 are connected to distinct runs or sets of conduits. A first run or set 1406 extends from one terminal enclosure 1402 and a second run or set 1408 extends from the other terminal enclosure 1404. As illustrated the terminal enclosures can also be hung from a surface using hangar elements, such as hangar elements 1410 from terminal enclosure 1402. Both runs or sets converge at a junction point 1412 and can be tied together using a coupler assembly 1414. Thus, the coupler assembly 1414 can merge together conduits from the first run or set 1406 and the conduits from the second run or set 1408. While two terminal enclosures are illustrated a coupler assembly could integrate the conduits of any number of sets of conduits from a plurality of terminal enclosures or adjacent systems/structures.

Figure 15:
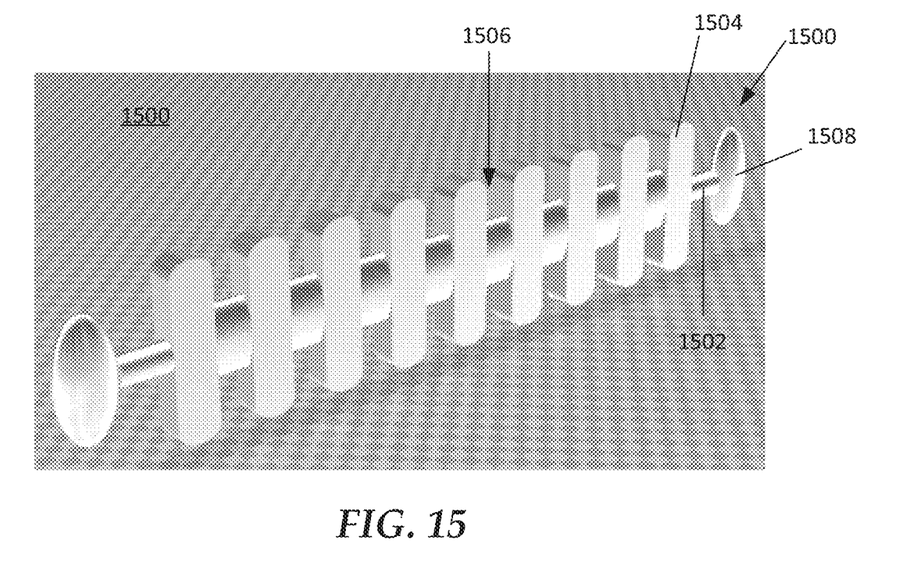
FIG. 15 is a perspective view of an example alignment tool for use in accordance with the present disclosure.

FIG. 15 illustrates an example alignment tool 1500 that can be used during modular assembly installation (e.g., coupler assemblies and conduits). Variations or deviations along the length of a conduit being installed due to causes such as dropping the conduits, or manufacturing errors may result in installation difficulties. For example, if a conduit is bent because it was dropped during installation, this may cause a curve in the conduit. These variations may make it difficult to mate the conduit to an adjacent coupler assembly, or if the conduit can be installed, a curvature may remain. In these instances, the tool 1500 can be used to re-align adjacent conduits.

The tool 1500 can include a bar 1502 having tabs extending therefrom, such as tab 1504. A portion of a tab extends above and a portion extends below the bar 1502. The tabs of the tool are spaced apart from one another, creating grooves, such as groove 1506, that receive the conduits of a modular assembly (not shown in this figure). The tool can be laid flat relative to a set of conduits or even a row of conduits and the conduits can lay into the grooves of the tool. The tool 1500 has handles, such as handle 1508 disposed on the terminal ends of the bar 1502, which can be gripped by the user during use. When the conduits are positioned in grooves, the user can draw the tool down the length of the conduits. This movement causes the conduits to conform to the tool due to the malleable nature of the conduits. Thus, the tool can straighten out any irregularities present in the conduits.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form.

What is claimed is:

1. A coupler assembly comprising:
   a first conduit interface comprising:
      a first conduit body;
      a first plurality of conduit interfaces extending normally from the first conduit body, the first plurality of conduit interfaces being aligned with a first set of conduits; and
      a plurality of alignment protrusions; and
   a second conduit interface comprising:
      a second conduit body;
      a second plurality of conduit interfaces extending normally from the second conduit body, the second plurality of conduit interfaces being aligned with a second set of conduits; and
      a plurality of alignment receivers configured to mate with the plurality of alignment protrusions of the first conduit interface.

2. The coupler assembly according to claim 1, wherein when the plurality of alignment receivers mate with the plurality of alignment protrusions, pathways are created between the first set of conduits and the second set of conduits.

3. The coupler assembly according to claim 1, wherein the plurality of alignment receivers and the plurality of alignment protrusions are arranged so as to align the first set of conduits and the second set of conduits.

4. The coupler assembly according to claim 1, wherein the coupler assembly comprises a hanger assembly comprising an armature that cooperates with a suspension member to allow the coupler assembly to attach to a mounting surface.

5. The coupler assembly according to claim 1, further comprising a support assembly that mates with the first set of conduits.

6. The coupler assembly according to claim 1, wherein the first conduit body is a plate.

7. The coupler assembly according to claim 1, wherein the first conduit interface and the second conduit interface are joined together by inserting the plurality of alignment protrusions into the plurality of alignment receivers until the first conduit interface contacts the second conduit interface.

8. The coupler assembly according to claim 1, wherein the first conduit interface and the second conduit interface are secured together using one or more fasteners.

9. A system, comprising:
   a plurality of modular sections, each of the plurality of modular sections comprising a coupler assembly and a plurality of conduits; and
   the coupler assembly comprising:
      a first conduit interface comprising:
         a first conduit body;
         a first plurality of conduit interfaces extending normally from the first conduit body, the first plurality of conduit interfaces mating with the plurality of conduits; and
         a plurality of alignment protrusions; and
      a second conduit interface comprising:
         a second conduit body;
         a second plurality of conduit interfaces extending normally from the second conduit body; and
         a plurality of alignment receivers configured to mate with the plurality of alignment protrusions of the first conduit interface, wherein the plurality of conduits mate with another coupler assembly of an adjacent one of a plurality of conduit assemblies.

10. The system according to claim 9, further comprising a gasket positioned between the first conduit body and the second conduit body, the gasket creating a watertight seal when the first conduit body and the second conduit body are joined together.

11. The system according to claim 9, wherein when the plurality of alignment receivers mate with the plurality of alignment protrusions, pathways are created between the plurality of conduits of the coupler assembly and the plurality of conduits of the another coupler assembly.

12. The system according to claim 9, wherein the coupler assembly comprises a hanger assembly comprising an armature that cooperates with a suspension member to allow the coupler assembly to attach to a mounting surface.

13. The system according to claim 9, further comprising a support assembly that mates with the plurality of conduits, the support assembly comprising a first portion, a second portion, and a third portion, wherein the support assembly comprises pass through apertures that are formed when the first portion, the second portion, and the third portion are joined together.

14. The system according to claim 9, wherein the first conduit body is a plate.

15. The system according to claim 9, wherein the first conduit interface and the second conduit interface are joined together by inserting the plurality of alignment protrusions into the plurality of alignment receivers until the first conduit interface contacts the second conduit interface.

16. The system according to claim 9, wherein the first conduit interface and the second conduit interface are secured together using one or more fasteners.

17. The system according to claim 9, further comprising a terminal enclosure interface that couples with an electric box, the terminal enclosure interface being substantially similar to the second conduit interface, but being arranged such that the second plurality of conduit interfaces extend into the terminal enclosure interface.

18. The system according to claim 9, wherein the plurality of conduits of one of the plurality of modular sections are angled or curved.

19. A system, comprising:
a plurality of modular sections, one of which connects to a terminal enclosure, each of the plurality of modular sections comprising at least one coupler assembly having a first plurality of conduit interfaces extending from a first side of the at least one coupler assembly and a second plurality of conduit interfaces extending from a second side of the at least one coupler assembly, wherein the first plurality of conduit interfaces and the second plurality of conduit interfaces are aligned and form pathways that allow wiring to extend through a plurality of conduit assemblies when the plurality of modular sections are arranged in series.

20. The system according to claim 19, further comprising a terminal enclosure interface that couples with one of the plurality of modular sections.

* * * * *